United States Patent [19]

Ball

[11] Patent Number: 5,657,406
[45] Date of Patent: Aug. 12, 1997

[54] EFFICIENT OPTICAL WAVELENGTH MULTIPLEXER/DE-MULTIPLEXER

[75] Inventor: Gary A. Ball, Simsbury, Conn.

[73] Assignee: United Technologies Corporation, Hartford, Conn.

[21] Appl. No.: 311,333

[22] Filed: Sep. 23, 1994

[51] Int. Cl.$^6$ .............................. G02B 6/28; H04J 14/02
[52] U.S. Cl. ................. 385/24; 385/15; 385/18; 385/27; 385/37; 385/42; 359/127; 359/130
[58] Field of Search ......................... 385/15, 24, 27, 385/28, 39, 42, 37, 17, 18; 359/127, 130

[56] References Cited

U.S. PATENT DOCUMENTS

| 4,900,119 | 2/1990 | Hill et al. | 385/37 X |
|---|---|---|---|
| 5,048,909 | 9/1991 | Henry et al. | 385/27 |
| 5,093,876 | 3/1992 | Henry et al. | 385/28 |
| 5,218,655 | 6/1993 | Mizrahi | 385/39 |
| 5,271,024 | 12/1993 | Huber | 385/37 X |
| 5,425,116 | 6/1995 | Dragone et al. | 385/24 |
| 5,446,809 | 8/1995 | Fritz et al. | 385/17 |

FOREIGN PATENT DOCUMENTS

| 0475016A2 | 3/1992 | European Pat. Off. | H04J 14/02 |
|---|---|---|---|
| 43 02 133 A1 | 7/1994 | Germany | H04J 14/02 |

OTHER PUBLICATIONS

Patent Abstracts of Japan, vol. 7, No. 239 (E–206) 25 Oct. 1983 &JP,A,58 129848 (Nippon Denshin Denwa Kosha) 3 Aug. 1983.

Manuel Lopez–Amo et al., "Wavelength–division–multiplexed distributed optical fiber amplifier bus network for data and sensors," Optic Letters, vol. 18, No. 14, Jul. 15, 1993, pp. 1159–1161.

C. M. Ragdale et al., "Integrated three channel laser and optical multiplexer for narrowband wavelength division multiplexing," Electronics Letters, vol. 30, No. 11, 26 May 1994, pp. 897–898.

F. Bilodeau et al., "High–Return–Loss Narrowband All–Fiber Bandpass Bragg Transmission Filter," IEEE Photonics Technology Letters, vol. 6, No. 1, Jan. 1994, pp. 80–32.

Technical Digest OFC '91, San Diego, California, Feb. 18–22, 1991, pp. 96–99, W. W. Morey, "Tunable Narrow––Line Bandpass Filter Using Fiber Gratings".

*Primary Examiner*—Brian Healy
*Attorney, Agent, or Firm*—Gerald L. DePardo

[57] ABSTRACT

An efficient wavelength multiplexer/demultiplexer includes a plurality of 2×2 optical couplers 122,180,200,220, each having a pair of matched gratings 130,142; 182,184; 202, 204; and 222,224, having bandpass wavelengths $\lambda_1$, $\lambda_2$, $\lambda_3$, $\lambda_4$, respectively, attached to two of the ports. An input signal 116 enters a port 120 and is split and reflected off the gratings 130,142 and then recombined so as to provide all the input signal 116 at an output port 150 and no reflection out of the port 120. Another input signal 154 is incident on the grating 142 which is passed by the grating 142 and is coupled onto the output port 150 with the signal 116 as a signal 160. A similar arrangement exists for the other couplers 180,200,220 connected in series, each of which adds another input wavelength. Alternatively, in a de-multiplexing application the signal 116 may be broadband and the signals 154,190,206,230 would be separate output wavelengths.

10 Claims, 5 Drawing Sheets

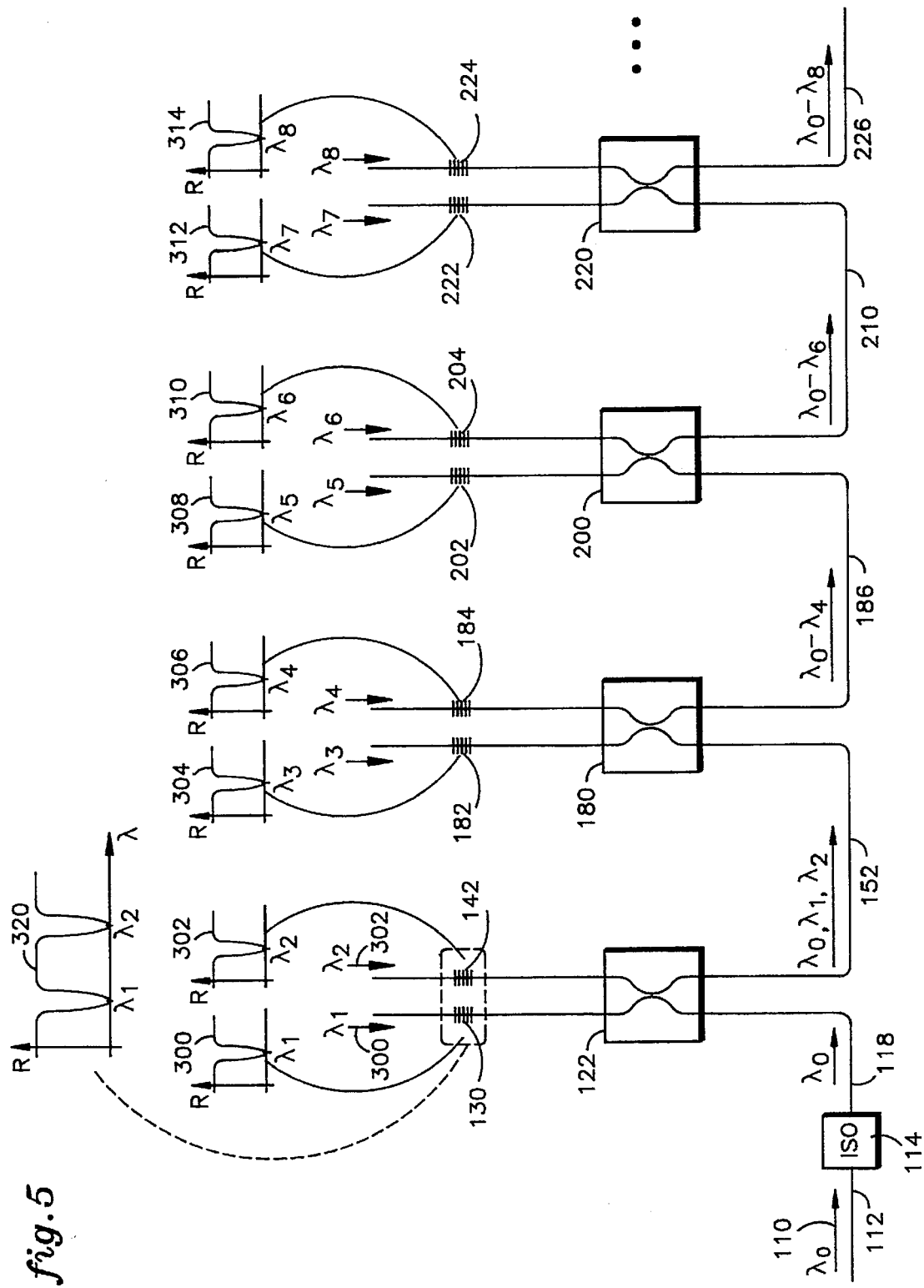

EFFICIENT OPTICAL WAVELENGTH MULTIPLEXER/DE-MULTIPLEXER

CROSS REFERENCE TO RELATED APPLICATIONS

Copending U.S. patent applications U.S. Pat. No. 5,446, 809, entitled "All Fiber Wavelength Selective Optical Switch" and Ser. No. 08/311,332, abandoned, entitled "Low-Loss Low-Reflection Wavelength Selective Optical Switch", both filed contemporaneously herewith, contain subject matter related to that disclosed herein.

TECHNICAL FIELD

This invention relates to wavelength coupling and more particularly to efficient wavelength coupling of a plurality of wavelengths onto an optical fiber.

BACKGROUND ART

It is known in the art of high speed optical communication systems that more than one wavelength may be used to carry information. In particular, each optical wavelength may be a carrier for digital or analog communication signals. Also, an optical switch may be used to discriminate on a wavelength basis as to which wavelengths get routed to which output(s) of the switch.

One prior art technique to couple a plurality, of wavelengths, e.g., 8, onto a signal fiber employs an arrangement of 2×2 couplers as shown in FIG. 1. In particular, two different wavelengths are fed into each 2×2 coupler in an input stage. A single output from each of the 2×2 couplers is fed to a second stage, where a single output from each pair of couplers is combined by another 2×2 coupler. A single output from each of the 2×2 couplers in the second stage is then fed to a third stage where each pair of outputs from the second stage is combined by another 2×2 coupler in the third stage.

The prior art arrangement shown in FIG. 1 couples eight wavelengths on eight separate fibers at the input stage to a single fiber at the output of the output stage. However, because there are three stages of coupling which occurs, and each stage incurs a 3 dB loss in the signal coupled, the total loss for a eight wavelength to one fiber coupling would be 87.5% loss (or 9 dB).

Thus, it would be desirable to obtain a device for efficient low loss multiplexing of a plurality of wavelengths onto a single optical fiber.

DISCLOSURE OF INVENTION

Objects of the invention include provision of an efficient multiplexing configuration for coupling a plurality of wavelengths on to a single optical fiber.

According to a first aspect of the present invention an optical wavelength multiplexer includes an optical coupler, having an input port, two bi-directional ports, and an output port, which couples a predetermined amount of a first input signal at the input port to the two bi-directional ports as coupled input light; a pair of reflective elements, each in the path of light exiting from one of the two bi-directional ports, and each having a predetermined reflectivity profile; the reflective elements each reflecting a predetermined wavelength-band of the coupled input light incident thereon back into a corresponding one of the two bi-directional ports as reflected input light; a predetermined amount of each of the reflected input light re-entering the corresponding one of the two bi-directional ports and being coupled by the coupler to the output port and the input port; the reflective elements, the coupler, and optical path lengths traveled by the coupled input light and the reflected input light having a cumulative phase shift such that light which is coupled to the input port destructively interferes at the input port and the light which is coupled to the output port constructively interferes at the output port, thereby providing substantially all of the first input light to the output port; one of the pair of reflective elements having a second input signal incident thereon and passing a predetermined wavelength-band of the second input signal which enters a corresponding one of the two bi-directional ports; a predetermined amount of the second input signal entering the corresponding one of the two bi-directional ports being coupled by the coupler to the output port; and thereby coupling a predetermined wavelength-band of the first input signal and a predetermined wavelength-band of the second input signal to the output port.

According further to the first aspect of the present invention, the other of the pair of reflective elements having a third input signal incident thereon and passing a predetermined wavelength-band of the third input signal which enters a corresponding one of the two bi-directional ports; a predetermined amount of the third input signal entering the corresponding one of the two bi-directional ports being coupled by the coupler to the output port; and thereby coupling a predetermined wavelength-band of the first input signal, the second input signal and the third input signal to the output port.

Still further according to the first aspect of the present invention, the pair of reflective elements have matching reflectivity profiles.

According to a second aspect of the present invention, an optical wavelength de-multiplexer includes an optical coupler, having an input port, two bi-directional ports, and an output port, which couples a predetermined amount of a first input signal at the input port to the two bi-directional ports as coupled input light; a pair of reflective elements, each in the path of light exiting from one of the two bi-directional ports, and each having a predetermined reflectivity profile; the reflective elements each reflecting a predetermined wavelength-band of the coupled input light incident thereon back into a corresponding one of the two bi-directional ports as reflected input light and at least one of the pair of reflective elements passing a predetermined wavelength band of the coupled input light to an associated output waveguide; a predetermined amount of each of the reflected input light re-entering the corresponding one of the two bi-directional ports being coupled by the coupler to the output port and the input port; the reflective elements, the coupler, and optical path lengths traveled by the coupled input light and the reflected input light having a cumulative phase shift such that light which is coupled to the input port destructively interferes at the input port and the light which is coupled to the output port constructively interferes at the output port, thereby providing substantially all of the first input light to the output port; and thereby coupling a predetermined wavelength-band of the first input signal to the output waveguide.

According further to the second aspect of the present invention, the pair of reflective elements have matching reflectivity profiles.

The invention represents a significant improvement over the prior art by providing an efficient multiplexing configuration that simply and inexpensively couples a plurality of individual wavelengths onto a single optical fiber.

Alternatively, the invention may also be used as a demultiplexer to separate out individual wavelengths from one input having a plurality of wavelengths to a plurality of separate outputs.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 5 is a schematic block diagram of an alternative embodiment for a multiplexing configuration for coupling a plurality of wavelengths onto a single optical fiber using less couplers, in accordance with the present invention.

BEST MODE FOR CARRYING OUT THE INVENTION

Figure 1:
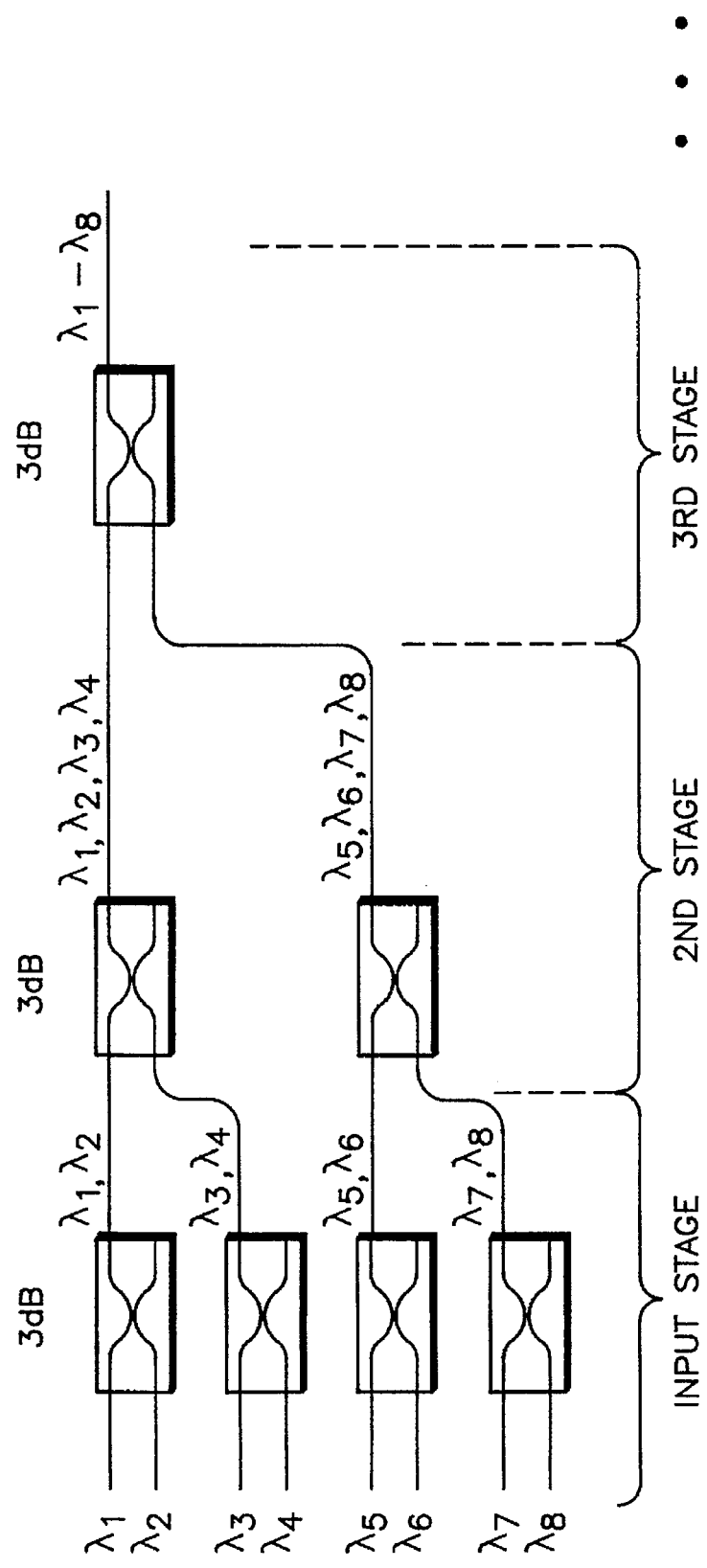
FIG. 1 is a prior art wavelength multiplexing arrangement.
Figure 2:
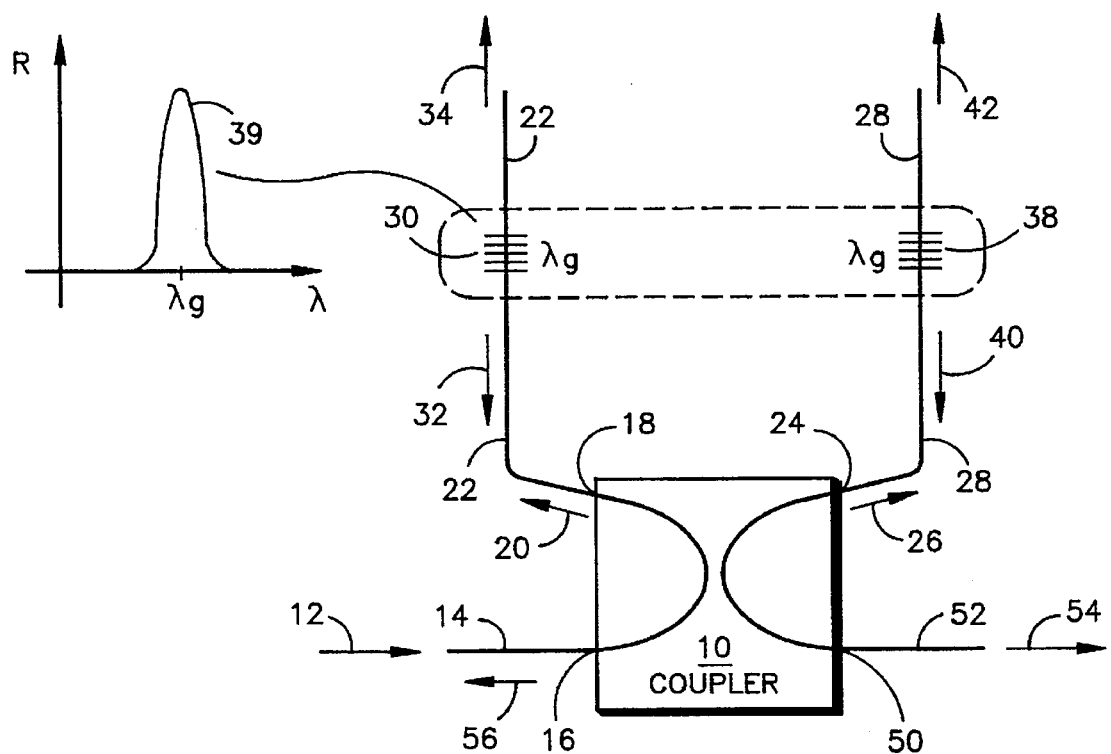
FIG. 2 is a prior art bandpass filter having a Michelson interferometer arrangement.

Referring to FIG. 2, a prior art Michelson interferometer-based bandpass filter arrangement of the prior art comprises a 2×2 optical coupler 10, e.g., a 3 dB or 50% or 50/50 optical coupler, which receives an input signal 12 along an optical fiber 14 which is fed to a port 16 of the coupler 10. A predetermined portion of the input light 12, e.g., 50%, exits a port 18 of the coupler 10 as indicated by a line 20 along a fiber 22. The remaining portion of the light 12 is coupled to a port 24 of the optical coupler 10 as indicated by a line 26 along a fiber 28.

The light 20 travels along the fiber 22 and is incident on a Bragg grating 30 which reflects a narrow wavelength band of light centered at a reflection wavelength $\lambda_G$, as indicated by a line 32 and passes all remaining wavelengths, as indicated by a line 34.

The light 26 that exits the coupler 10 along the fiber 28 is incident on a grating 38, identical to (or matching) the grating 30, having a central reflection wavelength centered at the wavelength $\lambda_g$. A reflectivity profile (or filter function) of the gratings 30.38 is shown by the curve 39. The light reflected at the wavelength $\lambda_g$ by the grating 38 is indicated by a line 40 and all remaining wavelengths are passed by the grating 38 as indicated by a line 42. The light 32 re-enters the coupler 10 at the port 18 and the reflected light 40 re-enters the coupler 10 at the port 24. This is similar to the basic principle of a Michelson interferometer that well known in the optical art. The signal 12 which enters the port 16 of the coupler 10 incurs a phase shift of $\pi/2$ upon coupling to the opposite leg and exiting the output port 24 along the fiber 28. Upon reflecting off the grating 38, the signal 26 experiences another $\pi/2$ due the reflection from the grating 38. As a consequence, there is a net total phase shift of 180° or $\pi$ from the input signal 12 to the reflected signal 40. Similarly, the light 12 entering the coupler 16 is also coupled to the output port 18 on the fiber 22 as the signal 20 without any phase shift. The signal 20 is reflected off the grating 30 as the signal 32 which experiences a $\pi/2$ or 90° phase shift. The signal 32 re-enters the coupler 10 at the port 18 and the portion which crosses-over to the port 50 experiences an additional $\pi/2$ phase shift due to the crossover. Thus, the signal 54 exiting the coupler 50 comprises the wavelength $\lambda_g$ of the input signal 12 which has been split 50/50 and then recombined completely in-phase so as to constructively interfere at the output port 50 of the coupler 10, thereby providing substantially the input signal 12 at the wavelength $\lambda_g$ at the output fiber 152. Similarly, there is destructive interference at the port 16 thereby preventing any light 56 from exiting the coupler 10 along the fiber 14. In particular, the reflected light 40 from the grating 38 which re-enters the coupler 10 at the port 24 is coupled over to the port 16 and incurs an additional $\pi/2$ phase shift, thereby having incurred a total of 270° (or $3\pi/2$) phase shift. However, the reflected light 32 from the grating 30 which re-enters the port 18 has experienced a $\pi/2$ or 90° phase shift and is coupled to the port 16 without experiencing any additional phase shift. Thus, the returning signal 32 has incurred a total of 90° phase shift and the returning signal 40 at the port 16 has incurred a total of 270° phase shift, thereby having a 180° phase shift between the signals and thus destructively interfering at the input port 16. Therefore, no light 56 from exits the input port 16 along the fiber 14. Such a device is described in the publication W. W. Morey, "Tunable Narrow-Line Bandpass Filter Using Fiber Gratings," Technical Digest, Optical Fiber Communication Conference, San Diego, Calif. Feb. 18–22, 1991, which is incorporated herein by reference.

Figure 3:
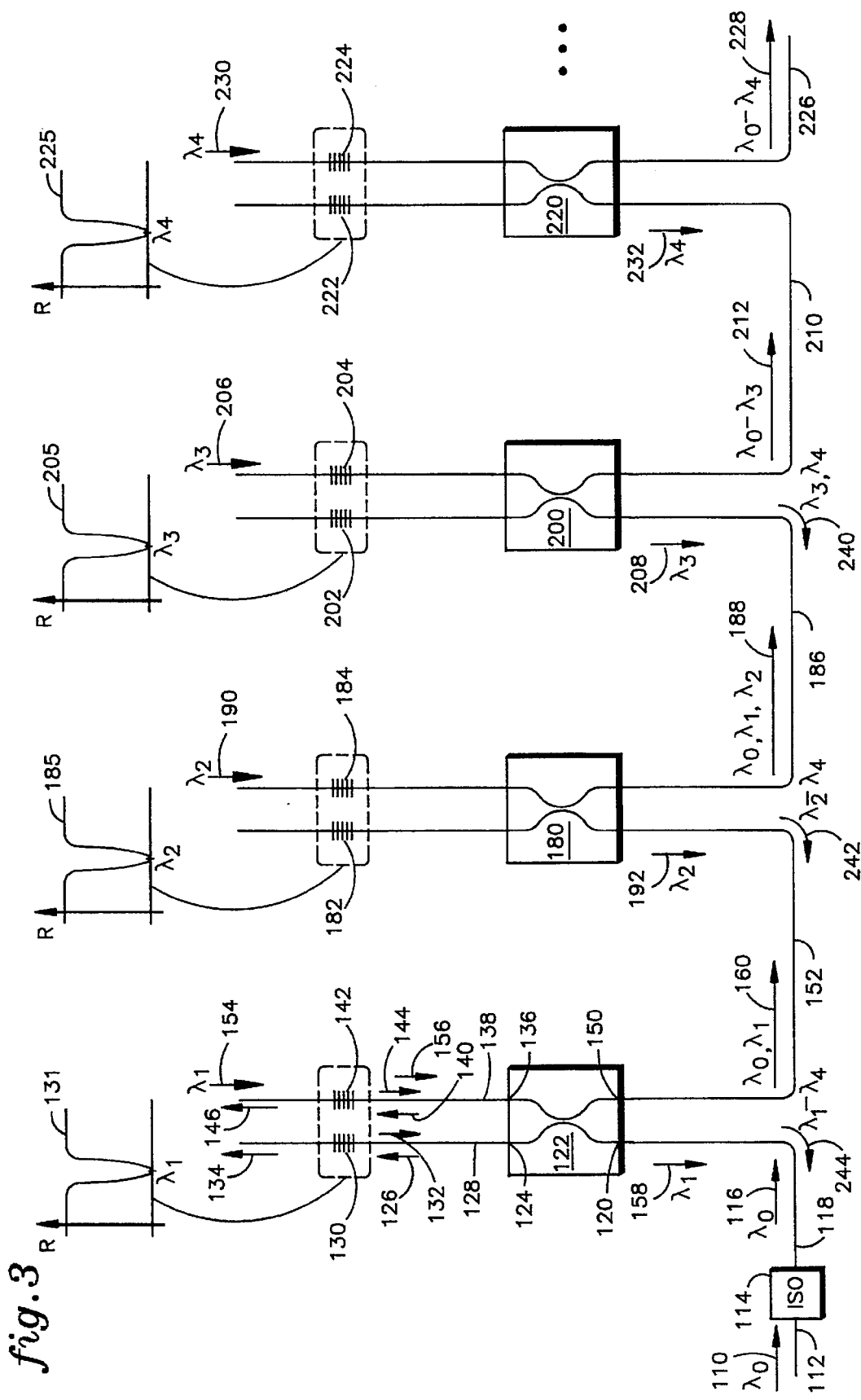
FIG. 3 is a schematic block diagram of a multiplexing configuration for coupling a plurality of wavelengths onto a single optical fiber, in accordance with the present invention.

Because the amount of phase shift of each signal is important for proper operation, the length of the optical path from the port 18 to the grating 30 must be the same as, or an integral ½ number of wavelengths of, the optical path length from the port 24 to the grating 38. Also, it should be understood that these optical path lengths may cause the total phase shift for the signals to be different than the example discussed hereinbefore; however, it is only required that the phases cancel at the input port 16 and add at the output port 50, to provide no reflection of the input wavelengths to the couplers. If the phases do not perfectly cancel, some amount of reflection will be seen. The amount of allowable reflection is determined by the application. Consequently, thermal effects should also be kept constant or matched for both path lengths to avoid changes in the amount of light reflected. Also, it should be understood that the amount of phase shift may be other than 90 degrees after being reflected from the grating for wavelengths of the incident light at other than the reflection wavelength of the grating. Referring now to FIG. 3, a first embodiment of the present invention accepts an input signal 110 which propagates along an optical fiber 112 to an optical isolator 114. The output of the isolator 114 provides an optical signal 116 on an optical fiber 118 to a port 120 of a 2×2 optical coupler 122, e.g., a 3 dB or 50/50 or 50% optical coupler. A predetermined portion, e.g., 50% of the input signal 116 is coupled to an output port 124 of the coupler 122 as indicated by a line 126, along a fiber 128. The light 126 is incident on the fiber Bragg grating 130. The grating 130 has a reflection profile, as indicated by a curve 131, of a narrow bandpass or filter having central part of the bandpass region at the wavelength $\lambda_1$ which is the same as the reflection wavelength of the grating 130. Thus, the grating 130 passes a narrow wavelength band of light $\lambda_1$ as indicated by a line 132 and reflects the remaining wavelengths as indicated by a line 134.

Symmetrically, the remaining portion of the light 116 exits the coupler 122 from a port 136 on a fiber 138 as indicated by a line 140. Line 140 is incident on a grating 142 which is identically matched in reflectivity profile to that of the grating 130. The grating 142 passes a narrow wavelength band of light centered at the wavelength $\lambda_1$ as indicated by a line 144 and passes the remaining wavelengths as indicated by a line 146. The reflected light 132,144 from the matched gratings 130,142 re-enter the coupler 122 at the ports 124,136, respectively, and constructively interfere within the coupler 122 as discussed hereinbefore with respect to FIG. 2 such that all the reflected light at the wavelength $\lambda_0$ exits a port 150 of the coupler 122. Because light both exits and re-enters the ports 124,136, they may be referred to as "bi-directional" ports herein.

Additionally, another input signal 154 travels along the fiber 138 and is incident on the fiber grating 142, such signal 154 having a wavelength $\lambda_1$ which passes through the grating 142 and enters the coupler 120 at the port 136. As indicated by a line 156, a predetermined portion, e.g., 50%, of the light 56 is coupled to the port 120 along the fiber 118 as indicated by a line 158. Similarly, the remaining portion, e.g., 50%, of the light 156 is coupled to the output port 150 along the fiber 152. The wavelengths $\lambda_0$ and $\lambda_1$ which exit the coupler 122 at the port 150 along the fiber 152 are collectively indicated by a line 160. The light 158 travels along the fiber 118 and enters the isolator 114 which prevents the light 158 from exiting the input port along the line 112.

Therefore, the wavelength $\lambda_1$ has been coupled onto the fiber 52 along with the wavelength $\lambda_0$. Also, the wavelength $\lambda_1$ on the fiber 152 experiences a 3 dB or 50% attenuation. However, the input signal 110 of $\lambda_0$ experiences minimum attenuation.

The fiber 152 is fed to a similar configuration as that discussed hereinbefore with the coupler 122 comprising a 2×2 coupler 180 and a pair of matched gratings 182,184 each of which has a bandpass reflectivity profile as shown by a curve 185 such that the wavelength $\lambda_2$ is passed and all other wavelengths are reflected. Consequently, the wavelengths $\lambda_0$, $\lambda_1$ on the input line 160 to the coupler 180 are coupled directly to the output along a fiber 186 as indicated by a line 188. Additionally, an input signal 190 comprising a wavelength $\lambda_2$ is incident on the grating 184 and exits the coupler along the fiber 152 as indicated by a line 192 and a line 188. The light 190 is coupled 50/50 along each of the fibers 152,186, respectively. Thus, the wavelengths $\lambda_0$, $\lambda_1$, $\lambda_2$ propagate along the fiber 186. The fiber 186 is fed again to a similar arrangement comprising a 2×2 coupler 200 and a pair of matched gratings 202,204 each having a bandpass reflectivity characteristic centered at $\lambda_3$, as shown by a curve 205. Additionally, an input signal 206 is incident on the grating 204 which passes the wavelength $\lambda_3$ and enters the coupler 200, and a portion thereof, e.g., 50%, exits the coupler 200 as indicated by a line 208, and the remaining portion exits the coupler 200 on a fiber 210, as indicated by a line 212. The wavelengths $\lambda_0$, $\lambda_1$, $\lambda_2$ are coupled in their entirely to the fiber 210, thereby adding in the wavelength $\lambda_3$ to the prior chain of $\lambda_0$, $\lambda_1$, $\lambda_2$, all along the fiber 210.

The fiber 210 is fed to a similar arrangement as the prior configurations comprising a 2×2 coupler 220 and a pair of matched gratings 222,224 which both have a bandpass reflectivity profile centered at the wavelength $\lambda_4$ as indicated by a curve 225 and which provide the Michelson interferometer effect discussed hereinbefore. Thus, the entire signal 212 comprising the wavelengths $\lambda_0$, $\lambda_1$, $\lambda_2$, $\lambda_3$ is coupled over to an output fiber 226, as indicated by a line 228.

Additionally, an input signal 230 having a wavelength $\lambda_4$ is incident on the grating 224 which passes the wavelength $\lambda_4$. The signal 230 then passes to the coupler 220 which couples a predetermined portion, e.g., 50%, of the signal 230 onto the fiber 226, which is combined with the other wavelengths to provide an output signal 228 on the fiber 226 having the wavelengths $\lambda_0$, $\lambda_1$, $\lambda_2$, $\lambda_3$, $\lambda_4$. The rest of the signal 230 is coupled to the fiber 210 as indicated by the line 232. Also, the reflected signals 158,192,208,232 from the couplers 122,180,200,220 are successively passed backwards along the chain as indicated by the lines 249,242,244 which ultimately pass to the isolator 114 which does not allow such signals to exit the input fiber 112 and disrupt up-stream sources, and does not reflect such signals back into the coupler 122.

Figure 4:
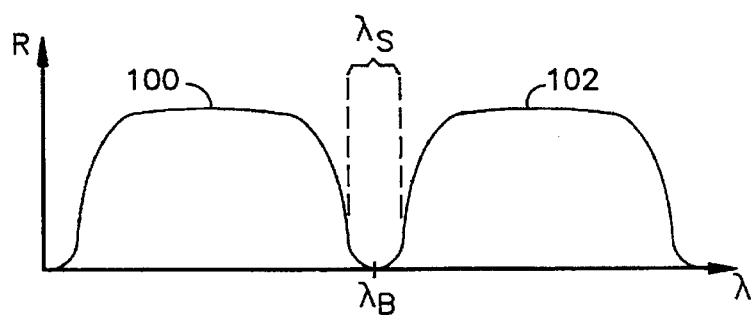
FIG. 4 is a graph of reflectivity against wavelength for a bandpass filter function created by one or more Bragg gratings, in accordance with the present invention.

It should be understood that this progression may continue for any number of wavelengths and the maximum degradation or attenuation which occurs on any of the input signals is an initial 3 dB attenuation only (plus any additional small loss due to coupler loss or due to not having gratings with 100% reflection), independent of the number of wavelengths to be coupled onto the output fiber. Referring to FIG. 4, to make the narrow bandpass reflectivity profile shown by the curves 131,185,205,225 of FIG. 3, the grating may be made by two broad reflectivity band gratings 100, 102 placed side by side having a predetermined wavelength spacing $\lambda_S$ therebetween. The wavelength spacing $\lambda_S$ is the bandpass region, with the center of that region $\lambda_B$ being the center of the bandpass profile as indicated in FIG. 4. The broadband reflectivity profiles 100,102 may be created as is known by a chirped or aperiodic refractive index variation distribution along the core of the fiber such as is discussed in co-pending U.S. patent application Ser. No. 08/169,796 entitled "Method and Apparatus for Forming Aperiodic Gratings and Optical Fibers."

To date, broadband (e.g., 15 nm) gratings have been fabricated in highly photosensitive hydrogen load fibers. Broader chirped gratings can be fabricated interferometrically by placing appropriate radii of curvatures on the interfering beams. Another technique is to use known phase masks, with the grating chirp and transmission notch profiles encoded, which exposes the proper grating profile into the fibers in a reliable and repeatable way.

Referring again to FIG. 3, the coupler 122,180,200,220 may be a fused tapered coupler which is currently commercially available in photosensitive fibers such as a Corning SMF 28. Since this technology is well established it is possible to procure these tapered couplers in more highly photosensitive specialty fibers. In addition, the use of techniques such as hydrogen loading to increase fiber photosensitivity is also possible. In order to maximize efficiency, the gratings should be highly reflective and sufficiently broadband to cover the required bandwidth of the wavelength division multiplexed system. Maintenance of relatively short interferometer arms that the gratings are located on help to minimize interferometer sensitivity due to environmental effects. Also, the gratings may be written before the fused tapered coupler is packaged, thereby providing very short distance between the gratings the point where the signals are coupled. Also, as discussed hereinbefore and in the aforementioned OFC proceedings paper, the optical path lengths between each of the matched gratings and its respective coupler must be the same or differ by an integral number of wavelengths for constructive interference to occur.

Referring now to FIG. 5, an alternative embodiment of the present invention uses the same basic coupler/grating arrangement as in FIG. 3 except that input signals are provided into both arms of the coupler. In this configuration, the gratings associated with a given coupler each have a different bandpass wavelength, as indicated by the curves 300–314. This allows the coupling of two wavelengths onto the output fiber of a given coupler instead of coupling only one wavelength. This configuration is more efficient than the embodiment of FIG. 3 by requiring only one-half the number couplers to couple the same number of wavelengths. It should be understood that the phase shift and reflectivity should be the same for gratings at the wavelengths being reflected back into the couplers (i.e., at other than the bandpass wavelengths) to ensure proper phase interaction (constructive and destructive interference) for the Michelson interferometer portion of the configuration, discussed hereinbefore.

Alternatively, for ease of fabrication with the embodiment of FIG. 5 and to maximize matching of gratings, the two gratings associated with a given coupler may pass both wavelengths (e.g., $\lambda_1$ and $\lambda_2$ for the coupler 122, FIG. 5), thus placing two wavelength bandpass regions on each grating, as indicated by the curve 320. In that case, the gratings for a given coupler would have identical filter functions, thereby allowing the gratings to be made simultaneously and ensuring that the phase shift of each grating is the same at non-bandpass wavelengths, to ensure proper phase interaction (constructive and destructive interference) for the Michelson interferometer portion of the configuration, discussed hereinbefore.

Figure 6:
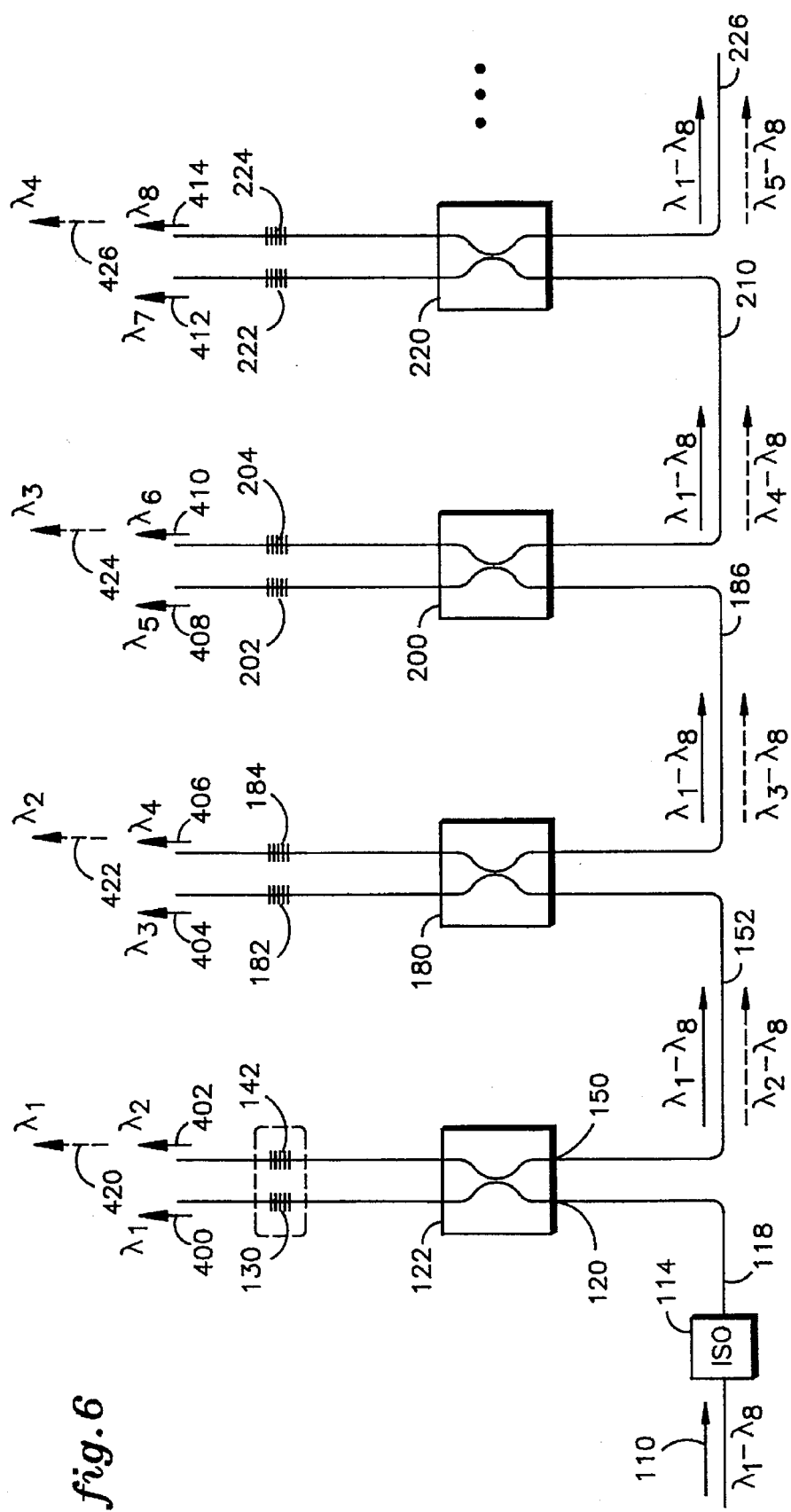
FIG. 6 is a schematic block diagram of an alternative application of the present invention as a demultiplexer, in accordance with the present invention.

Referring now to FIG. 6, alternatively, the invention may be used as a demultiplexer. In that case, the input signal 110 is a broad wavelength-band signal comprising a plurality of wavelengths, e.g., $\lambda_1$–$\lambda_8$. If the gratings are configured with the reflectivity profiles shown by the curves 300–314 of FIG. 5, each leg of the couplers that have a grating associated therewith allows the passband wavelength to pass as an output signal, as indicated by the solid lines 400–414. In that case, some of each input wavelength will exit the ports 120,150. Alternatively, if the gratings are matched and configured with the reflectivity profiles shown by the curves 131,185, 205,225 of FIG. 3, both legs of each coupler having gratings associated therewith pass the same passband wavelength so only one leg need be used as an output signal, as indicated by the dashed lines 420–426. Also, in that case, the isolator 114 is not needed.

Thus, when used in this application, the invention takes an input signal having a plurality of wavelengths and demultiplexes the wavelengths onto a plurality individual output lines, thereby providing an efficient all-fiber wavelength demultiplexer. Also, the isolator 114 at the input to the device may not be needed if the Michelson interferometer coupler/grating arrangement discussed hereinbefore provides no reflected wavelengths out of the input port 120 of the coupler 120, as would typically be the case.

Although the invention has been described and illustrated with respect to the exemplary embodiments thereof, it should be understood by those skilled in the art that the foregoing and various other changes, omissions and additions may be made without departing from the spirit and scope of the invention.

I claim:

1. An optical wavelength multiplexer, comprising:

a plurality of optical couplers, each having a corresponding input port, two corresponding bi-directional ports, and a corresponding output port, and each coupling a predetermined amount of a corresponding first input signal at said corresponding input port to said corresponding two bi-directional ports as coupled input light;

said couplers being connected to each other in a sequential series, said output port of each coupler being connected to the input port of the next coupler in said series, except for the last of said couplers in said series;

a pair of reflective elements corresponding to each of said couplers, each of said pair being in the path of light exiting from one of said two bi-directional ports, and each of said elements having a predetermined reflectivity profile;

said reflective elements each reflecting a predetermined wavelength-band of said coupled input light incident thereon back into a corresponding one of said two bi-directional ports as reflected input light;

a predetermined amount of each of said reflected input light re-entering said corresponding one of said two bi-directional ports being coupled by said coupler to said corresponding output port and said corresponding input port;

said reflective elements, each of said couplers, and optical path lengths traveled by said coupled input light and said reflected input light having a cumulative phase shift such that light which is coupled to said corresponding input port destructively interferes at said corresponding input port and the light which is coupled to said corresponding output port constructively interferes at said corresponding output port, thereby providing substantially all of said corresponding first input light to said corresponding output port;

one of said pair of reflective elements for each of said couplers having a second corresponding input signal incident thereon and passing a predetermined wavelength-band of said second corresponding input signal which enters a corresponding one of said two bi-directional ports;

a predetermined amount of said second corresponding input signal entering said corresponding one of said two bi-directional ports being coupled by said coupler to said corresponding output port for each of said couplers; and thereby coupling a predetermined wavelength-band of said first corresponding input signal and a predetermined wavelength-band of each of said second corresponding input signals for each of said couplers to the output port of said last of said couplers in said series.

2. The optical wavelength multiplexer of claim 1 further comprising:

the other of said pair of reflective elements having a third corresponding input signal incident thereon and passing a predetermined wavelength-band of said third corresponding input signal which enters a corresponding one of said two bi-directional ports;

a predetermined amount of said third corresponding input signal entering said corresponding one of said two bi-directional ports being coupled by said coupler to said output port; and thereby coupling a predetermined wavelength-band of said first corresponding input signal, said second corresponding input signal and said third corresponding input signal to said output port.

3. The optical wavelength multiplexer of claim 1 wherein said pair of reflective elements have matching reflectivity profiles.

4. The optical wavelength multiplexer of claim 2 wherein said pair of reflective elements have matching reflectivity profiles.

5. The optical wavelength multiplexer of claim 1 wherein said reflective elements comprise Bragg gratings.

6. An optical wavelength de-multiplexer, comprising:

a plurality of optical couplers, each having a corresponding input port, two corresponding bi-directional ports, and a corresponding output port, and each coupling a predetermined amount of a corresponding first input signal at said corresponding input port to said corresponding two bi-directional ports as coupled input light;

said couplers being connected to each other in a sequential series, said output port of each coupler being connected to the input port of the next coupler in said series, except for the last of said couplers in said series;

a pair of reflective elements corresponding to each of said couplers, each of said pair being in the path of light exiting from one of said two bi-directional ports, and each of said elements having a predetermined reflectivity profile;

said reflective elements each reflecting a predetermined wavelength-band of said coupled input light incident thereon back into a corresponding one of said two bi-directional ports as reflected input light and at least one of said pair of reflective elements passing a predetermined wavelength band of said coupled input light to a corresponding output waveguide;

a predetermined amount of each of said reflected input light re-entering said corresponding one of said two bi-directional ports being coupled by said coupler to said corresponding output port and said corresponding input port;

said reflective elements, each of said couplers, and optical path lengths traveled by said coupled input light and said reflected input light having a cumulative phase shift such that light which is coupled to said corresponding input port destructively interferes at said corresponding input port and the light which is coupled to said corresponding output port constructively interferes at said corresponding output port, thereby providing substantially all of said corresponding first input light to said corresponding output port; and thereby coupling a corresponding predetermined wavelength-band of said first corresponding input signal to said output waveguides of each of said couplers.

7. The optical wavelength de-multiplexer of claim 6 wherein said pair of reflective elements have matching reflectivity profiles.

8. The optical wavelength de-multiplexer of claim 6 wherein no light is reflected out of said corresponding input port.

9. The optical wavelength de-multiplexer of claim 6 wherein said reflective elements comprise Bragg gratings.

10. The optical wavelength de-multiplexer of claim 6 wherein said output waveguide is an optical fiber.

* * * * *